United States Patent [19]
Yamada

[11] Patent Number: 5,812,752
[45] Date of Patent: Sep. 22, 1998

[54] METHOD AND APPARATUS FOR ERROR RECOVERY IN A DISK DRIVE

[75] Inventor: Shuji Yamada, Fujisawa, Japan

[73] Assignee: International Business Machines Corporation, Armonk, N.Y.

[21] Appl. No.: 676,692

[22] Filed: Jul. 10, 1996

[30]   Foreign Application Priority Data

Sep. 21, 1995   [JP]   Japan ................................. 7-242858

[51] Int. Cl.⁶ .................................................. G06F 11/00
[52] U.S. Cl. ............................. 395/182.03; 395/185.08
[58] Field of Search ....................... 395/182.03, 182.18, 395/183.18, 185.08, 185.04; 371/41

[56]   References Cited

U.S. PATENT DOCUMENTS

| | | | |
|---|---|---|---|
| 5,189,566 | 2/1993 | Christensen et al. | 360/53 |
| 5,233,584 | 8/1993 | Kulakowski et al. | 369/44.27 |
| 5,379,162 | 1/1995 | Cunningham et al. | 360/53 |
| 5,412,518 | 5/1995 | Christner et al. | 360/66 |
| 5,475,542 | 12/1995 | Bentley et al. | 360/74.1 |

OTHER PUBLICATIONS

A. Tobari et al., "Dynamic Data Recovery Procedure On Hard Disk Drive," IBM Technical Disclosure Bulletin, vol. 38, No. 02, p. 449, Feb. 1995.

*Primary Examiner*—Robert W. Beausoliel, Jr.
*Assistant Examiner*—Scott T. Boderman
*Attorney, Agent, or Firm*—G. Marlin Knight

[57]   ABSTRACT

In an error recovery procedure (ERP) in a disk drive, the time needed to execute each step of the ERP is stored in a table. A timer measures the elapsed time from the start of the execution of the ERP, and the elapsed time is checked while executing the ERP. There are two types of ERP steps: those steps with (1) short execution times or (2) relatively long execution times. The two types of ERP steps are stored in different tables. An ERP step is selected and executed depending on the remaining execution time for the ERP.

16 Claims, 5 Drawing Sheets

| Step # | ERP ROUTINE | Address | Error Type | | | |
|---|---|---|---|---|---|---|
| 1 | Butterfly Seek | 112CA8 H | 0000 | 0000 | 0011 | 0010 |
| 2 | Butterfly Seek | 112CA8 H | 0000 | 0000 | 0011 | 0010 |
| 3 | Low RPM Burnish | 112DEA H | 0000 | 0001 | 0011 | 0011 |
| 4 | Butterfly Seek | 112CA8 H | 0000 | 0000 | 0011 | 0010 |

BIT 12-15: Reserved
BIT 11: Invalid DTCOMP
BIT 10: Invalid ID Event
BIT 9: DBUSY Drop
BIT 8: ECC Error
BIT 7: Bad Block
BIT 6: G-sensor Error
BIT 5: Sector Pulse Missing
BIT 4: DAM Not Found
BIT 3: Overrun
BIT 2: Write Fault
BIT 1: Write Abort
BIT 0: Target Phys sec# Not Found

| Step # | ERP ROUTINE | Address | [ms] | Error Type | | | |
|---|---|---|---|---|---|---|---|
| 1 | Read | 10A0000 H | 30 | 0000 | 1111 | 1111 | 1111 |
| 2 | Offtrack Read (micro step : −8h) | 10A100 H | 30 | 0000 | 0000 | 0011 | 0011 |
| 3 | Read after Dummy Write | 10A180 H | 100 | 0000 | 1111 | 1111 | 1111 |
| 4 | Read AGC Hold | 10A1A0 H | 30 | 0000 | 0000 | 0011 | 1011 |
| 5 | Read PLL Gain (High: −2, Normal: +2) | 10A1D0 H | 100 | 0000 | 0001 | 0001 | 1000 |
| 6 | Read Mode Cutoff Freq (−2) | 10A220 H | 60 | 0000 | 0001 | 0001 | 1000 |
| 7 | Read with skip errored servo area | 10A260 H | 100 | 0000 | 0000 | 0011 | 0011 |
| ... | ... | ... | ... | | | | |
| N | | | | | | | |

FIG. 3

| Error Type | | [sec] |
|---|---|---|
| BIT 0: | Target Phys Sec# Not Found | 5 |
| BIT 1: | Write Abort | 11 |
| BIT 2: | Write Fault | 0 |
| BIT 3: | Overrun | 0 |
| BIT 4: | DAM Not Found | 11 |
| BIT 5: | Sector Pulse Missing | 11 |
| BIT 6: | G-sensor Error | 0 |
| BIT 7: | Bad Block | 0 |
| BIT 8: | ECC Error | 5 |
| BIT 9: | DBUSY Drop | 0 |
| BIT 10: | Invalid ID Event | 0 |
| BIT 11: | Invalid DTCOMP | 0 |
| BIT 12: | Reserved | 0 |
| BIT 13: | Reserved | 0 |
| BIT 14: | Reserved | 0 |
| BIT 15: | Reserved | 0 |

*FIG. 5*

METHOD AND APPARATUS FOR ERROR RECOVERY IN A DISK DRIVE

The present invention relates to a method and apparatus for error recovery in a data storage system, and more particularly to a method and apparatus for an error recovery procedure.

Data used by a computer system can be stored on a storage device for later retrieval. A disk drive is a type of storage device. In a magnetic recording disk, digital information is magnetically stored on a disk surface in concentric circular patterns called tracks. A spindle motor rotates the disk. A head, mounted on an actuator arm, reads and writes data to the disk as the disk rotates with respect to the head. A servo system causes the actuator to position the head over a desired track. The head reads and writes the data in conjunction with read/write electronics. The head writes the data as digital information by selectively magnetizing an area of the disk surface.

Typically, the storage disks of a disk drive are stacked and are mounted on a single spindle. Information is usually stored on both surfaces of each disk. That is, each surface of a disk is usually exposed to at least one head for reading and writing information on the surface. The heads are mounted on actuator arms. The actuator arms move in tandem radially over the disk surfaces.

A track is divided into data sectors separated by servo sectors. The servo sectors contain positioning information. To access a particular track, an actuator positions the head over the track using the information in the servo sectors.

Various error recovery procedures (ERPs) are well known in the art for use when an error occurs while reading and writing data from the disk. Read errors arise from defects which are not found during manufacturing, such as non homogeneous magnetic surfaces and deterioration of the magnetic surface over time. When errors occur in the data, typically errors are corrected by error correction codes (ECCs). In addition, various error recovery routines (ERP routines) can be executed for read errors, such as changing the automatic gain control (AGC) gain, reading the data by positioning the head off-track, and adjusting the bias value of a magnetoresistive (MR) element. After executing the ERP routine, the data is re-read. If the data was read successfully, then the data will be used. If the data cannot be recovered after executing a number of ERP routines, then the error is a hard error and, if possible, the data will be reassigned to (be rerecorded in) another area.

MR heads have been recently adopted for use in disk drives. The output resistance of an MR head varies with changes in the magnetic field. The resistance variation causes a predetermined current to pass through the MR element, and therefore produces a voltage. However, thermal asperities cause errors when reading data with an MR head. If the MR head touches the projections on the disk and crashes, then the temperature of the MR element increases causing the MR resistance to vary. The MR resistance variation causes an abnormal read signal.

To counteract errors from thermal asperity, one ERP routine varies the speed of the disk rotation, which varies the flying height of the head, and therefore the body of the head cuts off the projections on the disk causing the thermal asperities.

Typically, the HDD microcode stores and executes various ERP routines as a sequence of consecutive steps in an ERP. If an error occurs while reading or writing data, a command to execute an ERP is sent. The HDD executes the ERP when it receives the command. In the ERP, some of the error recovery steps, i.e. standard reading conditions, are changed and regulated one at a time and the data is reread. For example, some standard reading conditions are:
 (1) the off-track quantity,
 (2) the bias current of an MR element,
 (3) the AGC gain, and
 (4) the follow-up speed of the phase-locked loop (PLL) circuit.

Typically, each step is executed according to a predetermined sequence and a retry (rereading) is done at each step. If the retry succeeds, then the ERP ends. If the retry is not successful, then the ERP ends when it reaches the maximum number of retries or the final step of the ERP, and the error will be reported to the host.

The host system has an allotted time (time-out value) for the command sent to the HDD, and typically the ERP completes within the allotted time. If the host system does not receive the completion of the read/write command within the allotted time, the host system determines that an error occurred. However, sometimes an ERP step takes a long time, such as reassigning the data or changing the flying height of the head. If a such an ERP step is executed, then the step often exceeds the allotted time, and the ERP step may be forcibly ended prior to completion. Although the error recovery may have been successful by continuing the ERP, since the ERP's allotted time has elapsed, the error recovery failure is reported to the system.

To prevent the command from timing-out, the time-out value can be set to the sum of the execution time required for all steps in the ERP sequence. The sum uses the maximum value (worst case value) of the time required for each step in the ERP sequence. However, a long timeout value does not always guarantee recovery. Also, using the maximum time-out value for each step is not desirable because it reduces the overall speed of operation.

A principal object of the present invention, therefore, is to provide an, error recovery procedure in a data storage device which executes within an allotted time.

In view of the foregoing object, the present invention provides a method and apparatus for executing an error recovery procedure in a data storage device. The error recovery procedure has a plurality of error recovery steps and measures the elapsed time from the start of the error recovery procedure, and determines the execution time for an error recovery step. The error recovery procedure selects and executes an error recovery step using a timeout value, the elapsed time, and the execution time of an error recovery step.

Furthermore, the error recovery steps are organized into a plurality of sets. In particular, each error recovery step is classified as either a static error recovery step or a dynamic error recovery step depending on the execution time of the step. A static error recovery step has an execution time less than a predetermined threshold. A dynamic error recovery step has an execution time greater than or equal to the predetermined threshold. The threshold is preferably one (1) second. The error recovery procedure selects and executes a dynamic error recovery step when the remaining time to complete execution of the error recovery procedure is sufficient to execute the set of dynamic error recovery steps and no additional static error recovery step. In particular, the error recovery procedure selects and executes a dynamic error recovery step if the execution time of the dynamic error recovery step is greater than the timeout value minus the elapsed time minus the time needed to execute a static error recovery step.

The error recovery procedure (ERP) monitors the elapsed time from when the HDD received a command to execute the ERP, and determines the next ERP step to execute at the end of each step using the elapsed time. Dynamic ERP steps take a relatively long time to execute, such as reassigning data to another position on the disk, or changing the flying height of a magnetic head. Although dynamic ERP steps take a long time, they are effective in recovering from errors. Static ERP steps take a short period of time to execute. Examples of static ERP steps include: changing channel parameters, changing an off-track quantity, and changing the bias current for an MR element.

If the dynamic and static ERP steps are efficiently executed in a limited time, a high error recovery rate is expected. Therefore, after a predetermined time from the execution of the ERP command has elapsed, the execution order of the ERP steps is changed according to the time that elapsed from the start of the execution of the ERP command so that the dynamic ERP steps, which have a high recovery rate, are executed and completed before the ERP time runs out.

Brief Description of the Drawings

FIG. 3 is a static error recovery table of the error recovery procedure of the present invention;

FIG. 5 is a second dynamic error recovery table of the error recovery procedure of the present invention.

Detailed Description of the Preferred Embodiments

A preferred embodiment of the present invention will hereinafter be described with reference to the drawings.

Figures 1, 4:
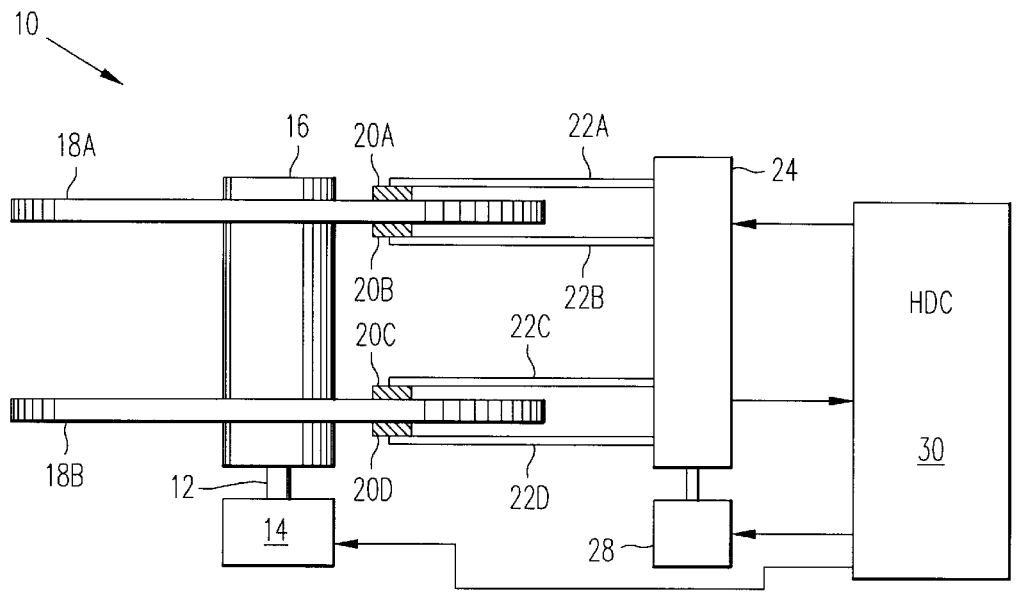
FIG. 1 is a diagram of a disk drive suitable for practicing the present invention.
FIG. 4 is a first dynamic error recovery table of the error recovery procedure of the present invention.

Referring to FIG. 1, a diagram of a hard disk drive (HDD) suitable for practicing the present invention is shown. A disk drive 10 has a disk assembly and a hard disk controller (HDC) 30. The HDC 30 has a central processing unit (CPU). The disk assembly has a disk drive unit (motor) 14 which spins a shaft 12 at a high speed. A cylindrical support block 16 is mounted on the shaft 12 such that the centers of the cylindrical support block 16 and shaft 12 are axially aligned. At least one disk 18A and 18B is mounted to the outer surface of the cylindrical support block 16 at predetermined intervals. When the disk drive unit 14 rotates the shaft 12, the disks 18A and 18B rotate along with the cylindrical support block 16.

Heads 20A, 20B, 20C, and 20D are supported by access arms 22A, 22B, 22C, and 22D. Each head 20A, 20B, 20C, and 20D opposes a corresponding disk surface. The access arms 22A, 22B, 22C, and 22D are operatively connected through a shaft 24 to a head drive unit 28 to position the heads over a desired track. The disk drive unit 14 and the head drive unit 28 connect to the HDC 30 which controls the rotation frequency and speed. The HDC 30 connects to a host system (not shown).

In a magnetic disk, such a hard disk or flexible disk, data is stored in concentric circular tracks. The head is radially positioned over a desired track in a seek operation. After the disk is rotating and a seek performed, data is read from or written to the disk. When seeking to a desired track, the head reads position information previously recorded on the disk.

When reading, errors occur from drop-outs in the data. It is well known that drop-outs are caused by defects or characteristic changes in the magnetic surface produced with the passage of time. Typically data is read using predetermined standard reading conditions between the disk, head, and HDC. The reading conditions include (1) setting an off-track quantity to a predetermined value which is a quantity of shift between the center of the magnetic head and the center of the track, (2) setting a bias current to a predetermined value if the head uses an MR element, (3) varying the signal amplification rate with AGC in order to get a constant reproduced signal amplitude, and (4) setting the follow-up speed of the PLL to a predetermined speed to make the velocity of the PLL constant to stabilize the sampling frequency.

When an error occurs, the ERP changes the standard reading conditions and then rereads (retry) the data. For example, followability of the PLL is intentionally deteriorated or the amplification rate of the AGC is held, and then the data is reread.

The ERP has a plurality of steps and recovers from errors within a limited amount of time. The error recovery steps are divided into static and dynamic steps. A static ERP step has an ERP routine which can be executed within a short period of time. Examples of static error recovery steps include: (a) AGC hold, (b) off-track read, and (c) read by skipping a servo area. Dynamic ERP steps have ERP routines which take a relatively long time to execute. Examples of dynamic error recovery steps include: (a) butterfly seek, and (b) low RPM burnish. The butterfly seek is a method which repeats a seek operation several times in the vicinity of the track in which the error occurred and then positions the head over the desired track. The low RPM burnish is a method which reduces the flying height of the head, thus the head structure removes projections and dust particles from the disk, which results in error recovery.

In the preferred embodiment of the present invention, a static ERP step executes in less than 1 second and a dynamic ERP step executes in 1 or more seconds. However, the invention is not limited to a 1 second threshold, and the ERP threshold can be changed to improve efficiency.

Figure 2:
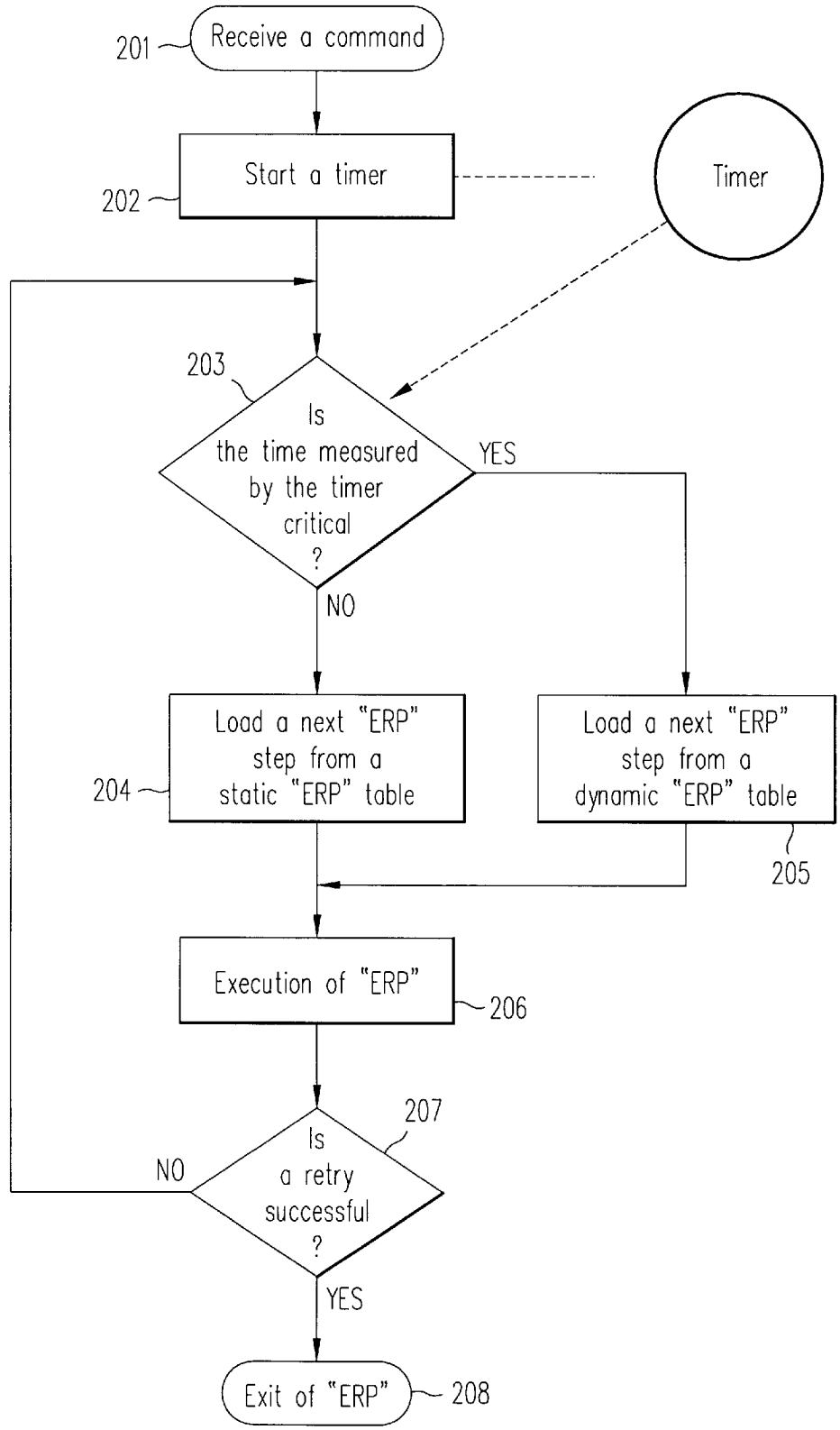
FIG. 2 is a flowchart of the error recovery procedure of the present invention.

Referring to FIG. 2, a flowchart showing the ERP according to the present invention is shown. The ERP steps are selected and executed sequentially. Initially, in step 201, a command to execute the ERP is received. Next, in step 202, a timer is started. The timer measures the elapsed time from starting the ERP command execution. In step 203, prior to loading an actual ERP step, the elapsed time is compared to a previously set critical time. If the elapsed time is less than the critical time, then, in step 204, the next static ERP step specified in the static ERP table is loaded. The steps in the static ERP table have been ordered for sequential execution. The error routine is executed in step 206.

However, in step 203, if the elapsed time is greater than or equal to the critical time, then in step 205, the next ERP step is loaded from the dynamic ERP table which has already been ordered for sequential execution. In step 206, the loaded step is executed.

Step 207 determines whether the retry (rereading) succeeded. If the retry succeeded, then step 207 advances to step 208 and the ERP ends. If the retry failed, then step 207 returns to step 203 and the process repeats.

Examples of static and dynamic ERP tables are shown in FIGS. 3, 4, and 5. The static and dynamic ERP tables are used to execute the ERP shown in FIG. 2.

Referring to FIG. 3, the static ERP table stores, for each step, the address of the step, the execution time, and data representing the applicable error type.

As shown in FIGS. 4 and 5, the dynamic ERP table consists of two tables. In FIG. 4, the first dynamic ERP table stores the address of each dynamic ERP and the corresponding error type. The error type in the rightmost column is expressed by 16 bits and indicates an error type where the ERP routine is executed. As shown in FIG. 4, various error types are assigned to bits 0 to 15. Bit 0 represents an error in which a target sector has not been found. Bit 1 represents that a write abort error occurred. Bit 4 represents the error that a data address mark (DAM) was not found. Bit 6 represents an error of an acceleration sensor (G sensor) which results when the disk vibrates.

In FIG. 4 step 1, a butterfly seek is executed if any of bits 1, 4, or 5 are set. But if bits 1, 4, or 5 are not set, then step I is not executed. For example, if a data address mark not found error occurs, represented by bit 4, then the ERP steps having a I in bit 4 (i.e. steps where a flag exists) are executed in order starting at step 1. Since bit 4 is set in steps 1 through 4, the butterfly seek of step 1, the butterfly seek of step 2, the low RPM burnish of step 3, and the butterfly seek of step 4 are executed. In summary, if a data address mark not found error occurs, then the butterfly seek is executed three times and the low RPM burnish is executed once. In contrast, if a physical target sector not found error occurs where only bit 0 is set, then only the low RPM burnish in step 3 is executed.

In FIG. 5, the second dynamic ERP table stores the total execution time for the dynamic ERP steps for each error type represented by bits 0 to 15. For example, a bit 0 error type requires 5 seconds to execute, while a bit 4 error type requires 11 seconds to execute. This difference arises because only dynamic ERP step 3 is executed for a bit 0 error, while dynamic ERP steps 1 through 4 are executed for a bit 4 error.

As shown in FIG. 3, the static ERP table stores for each ERP step its address, execution time, and error type. The description of the aforementioned dynamic ERP table error type also applies to the static ERP table error type because the static and dynamic error types are the same.

If a particular type of error occurs, then ERP routines where "1" is shown will be selected and executed sequentially beginning at step 1.

Figure 6:
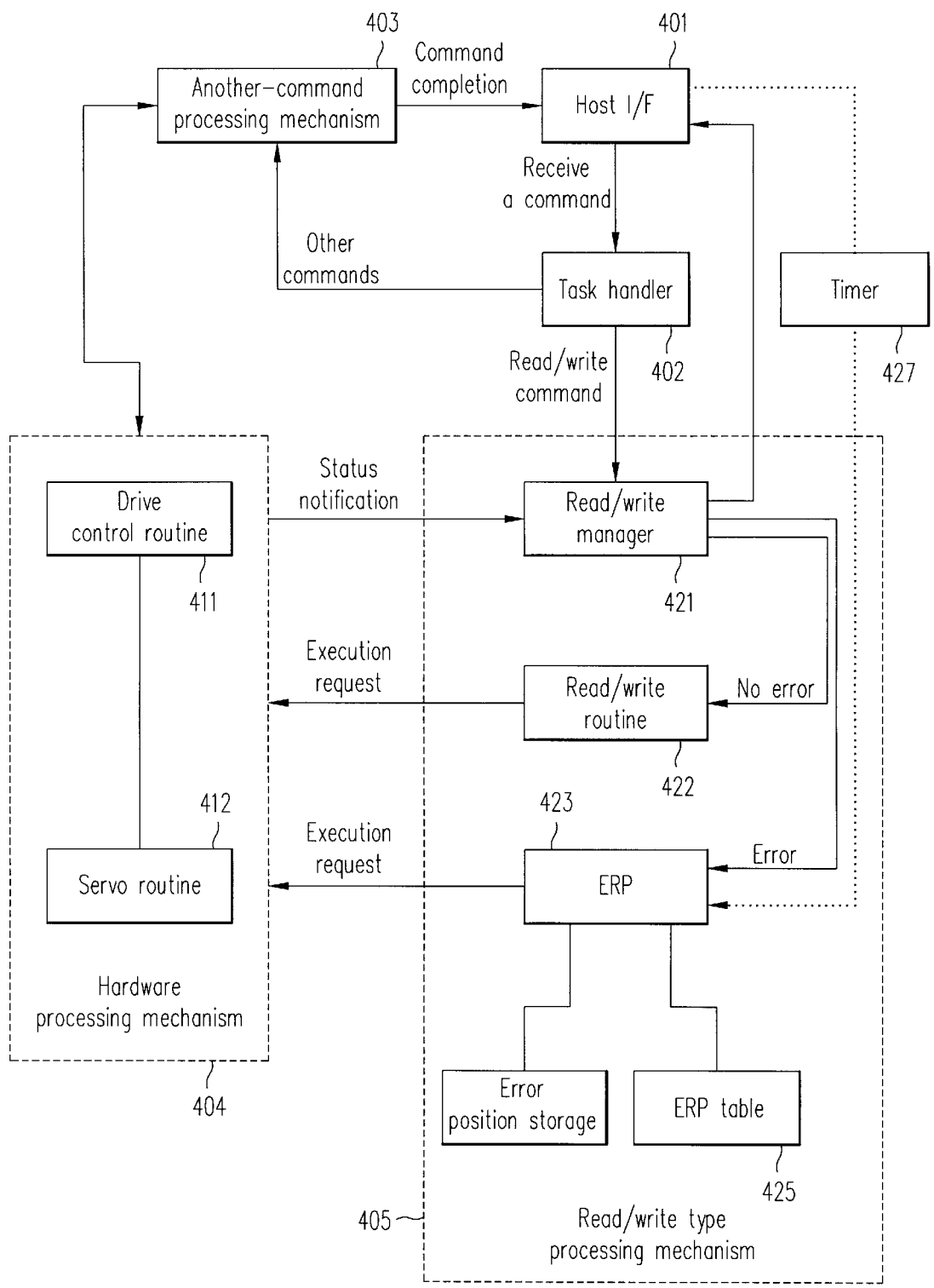
FIG. 6 is a block diagram of the error recovery procedure in the disk drive of the present invention.

FIG. 6 shows a system for executing the ERP and the changing of the execution order from static to dynamic steps. If a host interface 401 receives a command from a host system (not shown), then the command is sent to a task handler 402. The task handler classifies the command as either a read/write type of command or other type. The task handler 402 sends the read/write command to a read/write type processing mechanism 405, and sends other command types to another command processing mechanism 403.

A hardware processing mechanism 404 has a HDC (not shown), a drive control routine 411 for controlling a read/write channel, and a servo routine 412 for controlling the servo system. In the HDD, a read/write operation requires: (a) interpreting a command and finding the physical location where data is to be read or written, (b) positioning an actuator over the physical location of the data (seek), (c) reading or writing the data, and (d) if a track ends prior to completion of the reading or writing, seeking to the next track and reading or writing the remaining data. The read/write type processing mechanism 405 processes the command sent from the task handler 402, and evaluates the aforementioned error types.

In the read/write processing mechanism 405, a read/write manager 421 is a routine which evaluates the status to control which routine to execute next. A read/write routine 422 manages the execution of the routine selected by the read/write manager 421. The read/write routine 422 sends an execution request to the hardware processing mechanism 404. The execution request causes the hardware processing mechanism 404 to execute an operation. The hardware processing mechanism 404 sends the result of the operation to the read/write manager 421 as status notification. If the status notification indicates that the processing ended in an error-free state, then the read/write manager 421 shifts to the next operation. If the command processing is also complete, then the host system (not shown) is notified of the result via the host interface 401.

If the status notification indicates that an error occured, then the read/write manager 421 demands that the ERP 423 be executed. The ERP 423 is notified of the physical location of the error by the read/write manager 421, and executes a predetermined error recovery process with respect to the physical location of the error. If error recovery succeeds, then the ERP 423 returns to normal process operation.

Initially, the ERP 423 selects the next ERP routine to be executed according to the type of error from the static ERP table 425. The ERP 423 then executes the selected ERP routine in the order of the steps in the static ERP table. When a static ERP step is to be executed, the timing of the shift from static to dynamic ERP steps is determined from the elapsed time from the timer 427. That is, the checking of the timer, as shown in FIG. 2 step 203, is executed. When the time needed to execute the dynamic ERP step(s) is still assured, the ERP shifts from executing static ERP steps to executing dynamic ERP steps. Thereafter, dynamic ERP steps are executed.

For example, when a bit 4 type of error occurs, the ERP selects static ERP steps from the static ERP table and executes the selected static ERP steps according to the table shown in FIG. 3. As shown in FIG. 5, for a bit 4 error, the dynamic ERP steps require 11 seconds to execute. Before the remaining time of ERP execution, reaches 11 seconds, the ERP shifts from executing static ERPs to dynamic ERPs. The time at which the ERP shifts from static to dynamic ERP steps differs depending on the type of error. In addition, certain errors execute only static ERP steps.

If the static ERP steps fail to recover from the error, then it is effective to execute the dynamic ERP steps as the final step. The point of time at which the dynamic ERP steps begin is determined by the following equation:

```
If
    dynamic ERP step execution time < timeout value - (elapsed time +
next static ERP step execution time)
    then
        execute the static ERP step
    else
        execute the dynamic ERP step.
```

This conditional equation is considered at least when each static ERP step is ended. The timeout value is the total execution time of the ERP and is a predetermined value. If each step of the ERP is selected following the above equation, the dynamic ERP steps will be executed within the allotted time (timeout value) of the ERP. For example, if the timeout value is 30 seconds, if the execution time needed for the dynamic ERP step is 5 seconds, if the elapsed time is 24 seconds, and if the time needed to execute the next static ERP step is 2 seconds, then the 5 seconds needed to execute the dynamic ERP step is greater than the [(30−(24+2))=4] seconds. Therefore, the dynamic ERP step is executed. Since the 5 seconds required to execute the dynamic ERP step are guaranteed, the dynamic ERP steps end within the allotted time of the ERP.

If the aforementioned conditional equation is followed, static ERP steps are executed sequentially from the start of the ERP until a critical time. Just prior to the critical time, the ERP shifts from executing static ERP steps to dynamic ERP steps, and predetermined dynamic ERP steps are executed during the remaining time. The predetermined dynamic ERP steps are selected according to the error type described in the table of FIG. 4 when the ERP is executed.

In summary, in a disk drive error recovery procedure for reading or writing errors, the execution time for each step of a plurality of steps is stored in a table, a timer measures the elapsed time from starting execution of the ERP, and the ERP is executed by referring to the elapsed time. Therefore, each ERP step can be efficiently performed within a predetermined execution time for the ERP. That is, the ERP steps are divided by execution time into short and long ERP steps. The two types of ERP steps are stored in different tables, and each ERP step is executed in correspondence with the remaining execution time of the ERP.

Therefore, according to the error recovery method of the present invention, various steps of the ERP are efficiently executed and error recovery is improved.

A number of embodiments of the present invention have been described. Nevertheless, it will be understood that various modifications may be made without departing from the spirit and the scope of the invention. Accordingly, it is to be understood that the invention is not to be limited by the specific illustrated embodiments, but only by the scope of the appended claims.

I claim:

1. An error recovery method in a data storage device having an error recovery procedure with a plurality of error recovery steps, comprising the steps of:
    (a) measuring an elapsed time from the start of the error recovery procedure;
    (b) determining an execution time for an recovery step; and
    (c) selecting an executing an error recovery step with an execution time which is less than or equal to a remaining time, the remaining time being a timeout value minus the elapsed time.

2. The error recovery method as recited in claim 1 wherein the eroor recovery steps are organized into a plurality of sets, and said step (c) selects and executes error recovery steps from one set at a tiem, wherein one set of erro recovery steps has at least one static error recovery step having an execution time less than a predetermined theshold, and another set of error recovery steos has at least one dynamic error recovery step having an execution time greater than or equal to the predetermined threshold.

3. The error recovery method as recited in claim 1 wherein each error recovery step is classified as either a static error recovery step having an execution time greater thana predetermined threshold, or dynamic error recovery step having an execution time greater than or equal to a predetermined threshold.

4. The error recovery method as recited in claim 3 wherein a dynamic error recovery step is selectd and executed when the remaining time to complete execution of the error recovery procedure is sufficient to execute the dynamic error recovery step and no additonal static error recovery step.

5. The error recovery method as recited in claim 3 wherein if the execution time of the dynamic error recovery step is greater than the timeout value minus the elapsed time minus the execution time of the next static error recovery step, then a dynamic error recovery step is selected and executed.

6. The error recovery method as recited in claim 3 wherein dynamic error recovery steps are selected and executed when the remaining time to complete execution of the error recovery procedure is sufficient to execute all dynamic error recovery steps for a particular error type and no additional static error recovery step.

7. The error recovery method as recited in claim 3 wherein if the total execution time of all dynamic error recovery steps for a particular error type is greater than the timeout value minus the elapsed time minus the execution time of the next static error recovery step, then dynamic error recovery steps are selected and executed.

8. A data storage device having an error recovery procedure with a plurality of error recovery steps, comprising
    a timer for measuring an elapsed time from the start of the error recovery procedure;
    means for determining an execution time for an error recovery step; and
    means for selecting and executing an error recovery step with an execution time which is less than or equal to a remaining time, the remaining time being a timeout value minus the elapsed time.

9. The data storage device as recited in claim 8 wherein the error recovery steps are organized into a plurality of sets, and said means for selecting and executing selects and executes error recovery steps from one set at a time, wherein one set of error recovery steps has at least one static error recovery step having an execution time less than a predetermined threshold, and another set of error recovery steps has at least one dynamic error recovery step having an execution time greater than or equal to the predetermined threshold.

10. The data storage device as recited in claim 8 wherein each error recovery step is classified as either a static error recovery step having an execution time less than a predetermined threshold or a dynamic error recovery step having an execution time greater than or equal to a predetermined threshold.

11. The data storage device as recited in claim 10 wherein a dynamic error recovery step is selected and executed when the remaining time to complete execution of the error recovery procedure is sufficient to execute the dynamic error recovery step and no additional static error recovery step.

12. The data storage device as recited in claim 10 wherein if the execution time of the dynamic error recovery step is greater than the timeout value minus the elapsed time minus the execution time of the next static error recovery step, then a dynamic error recovery step is selected and executed.

13. The data storage device as recited in claim 10 a wherein dynamic error recovery steps are selected and executed when the remaining time to complete execution of the error recovery procedure is sufficient to execute all dynamic error recovery steps for a particular error type and no additional static error recovery step.

14. The data storage device as recited in claim 10 wherein if the total execution time of all dynamic error recovery steps for a particular error type is greater than the timeout value minus the elapsed time minus the execution time of the next static error recovery step, then dynamic error recovery steps are selected and executed.

15. A data storage device having a plurality of error recovery steps comprising:
    means for determining a timeout value for completion of error recovery;
    storage means containing a list of execution times for the error recovery steps;

timing means for measuring a time elapsed from the start of error recovery; and means for selecting an error recovery step for execution which has an execution time less than or equal to the timeout value minus the elapsed time.

16. The apparatus for error recovery as recited in claim 15 Wherein the error recovery steps are organized into static error recovery steps and dynamic error recovery steps, and the means for selecting selects a dynamic error recovery step if the execution time of the dynamic error recovery steps is less than or equal to the timeout value minus the elapsed time.

* * * * *

UNITED STATES PATENT AND TRADEMARK OFFICE
CERTIFICATE OF CORRECTION

PATENT NO. : 5,812,752
DATED : September 22, 1998
INVENTOR(S) : Shuji Yamada

Page 1 of 1

It is certified that error appears in the above-identified patent and that said Letters Patent is hereby corrected as shown below:

Column 7,
Line 39, after "for an", insert -- error --.
Line 41, after "selecting", delete "an" and insert -- and --.
Line 46, delete "eroor" and insert -- error --.
Line 48, delete "tiem" and insert -- time --; delete "erro" and insert -- error --.
Line 51, delete "steos" and insert -- steps --.
Line 56, delete "greater thana" and insert -- less than a --.
Line 57, after "or", insert -- a --.

Column 8,
Line 50, after "10", delete "a".

Column 9,
Line 7, delete "Wherein" and insert -- wherein --.

Signed and Sealed this

Second Day of April, 2002

*Attest:*

*Attesting Officer*

JAMES E. ROGAN
*Director of the United States Patent and Trademark Office*